United States Patent
Nagakura et al.

(10) Patent No.: US 10,760,535 B2
(45) Date of Patent: Sep. 1, 2020

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Keisuke Nagakura, Anjo (JP); Eiji Yamada, Hekinan (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 4 days.

(21) Appl. No.: 16/212,827

(22) Filed: Dec. 7, 2018

(65) Prior Publication Data

US 2019/0195176 A1  Jun. 27, 2019

(30) Foreign Application Priority Data

Dec. 27, 2017  (JP) .................................. 2017-251355

(51) Int. Cl.
| | |
|---|---|
| *F02M 26/49* | (2016.01) |
| *F02D 41/00* | (2006.01) |
| *F02M 26/42* | (2016.01) |
| *F02D 41/14* | (2006.01) |
| *F02D 41/22* | (2006.01) |

(52) U.S. Cl.
CPC ......... *F02M 26/49* (2016.02); *F02D 41/0052* (2013.01); *F02D 41/0077* (2013.01); *F02D 41/0085* (2013.01); *F02D 41/1454* (2013.01); *F02D 41/1456* (2013.01);

(Continued)

(58) Field of Classification Search
CPC .... F02M 26/49; F02M 26/42; F02D 41/0052; F02D 41/1456; F02D 41/0085; F02D 41/0077; F02D 41/1454; F02D 2041/228; F02D 2200/101; F02D 2200/04
See application file for complete search history.

(56) References Cited

U.S. PATENT DOCUMENTS

| | | | |
|---|---|---|---|
| 8,718,902 B2 * | 5/2014 | Katou ................. | F02D 41/0065 123/568.21 |
| 9,650,977 B2 * | 5/2017 | Martin ................ | F02D 41/1454 |

(Continued)

FOREIGN PATENT DOCUMENTS

| | | | |
|---|---|---|---|
| JP | 62288338 A | * | 12/1987 |
| JP | 2009-156216 A | | 7/2009 |

(Continued)

*Primary Examiner* — Carl C Staubach
(74) *Attorney, Agent, or Firm* — Oliff PLC (57) ABSTRACT

A control device for an internal combustion engine is disclosed. The internal combustion engine includes a plurality of cylinders, a fuel injection valve configured to supply fuel to each cylinder, an EGR passage configured to connect an exhaust passage and an intake passage, an EGR valve configured to adjust a flow rate of exhaust gas flowing from the exhaust passage into the intake passage through the EGR passage, and an air-fuel ratio sensor provided in the exhaust passage. The control device includes an electronic control unit configured to execute determination processing for determining that a degree of imbalance abnormality is greater when a fluctuation amount of a detection value of the air-fuel ratio sensor is relatively large than when the fluctuation amount is relatively small.

6 Claims, 7 Drawing Sheets

(52) U.S. Cl.
CPC ....... *F02M 26/42* (2016.02); *F02D 2041/228* (2013.01); *F02D 2200/04* (2013.01); *F02D 2200/101* (2013.01)

(56) References Cited

U.S. PATENT DOCUMENTS

| | | | |
|---|---|---|---|
| 2009/0171550 A1 | 7/2009 | Teraya | |
| 2011/0054761 A1* | 3/2011 | Sawada | F02D 41/0085 |
| | | | 701/103 |
| 2012/0006307 A1* | 1/2012 | Demura | F02D 41/1454 |
| | | | 123/674 |
| 2012/0166070 A1* | 6/2012 | Katou | F02D 41/0065 |
| | | | 701/108 |
| 2012/0215427 A1* | 8/2012 | Miyamoto | F02D 41/0065 |
| | | | 701/108 |
| 2013/0160750 A1* | 6/2013 | Maruyama | F02B 47/08 |
| | | | 123/568.21 |
| 2019/0195177 A1* | 6/2019 | Nagakura | F02D 41/0065 |

FOREIGN PATENT DOCUMENTS

| | | | |
|---|---|---|---|
| JP | 2011-226363 A | | 11/2011 |
| JP | 2011226363 A | * | 11/2011 |
| WO | 2011/055463 A1 | | 5/2011 |

* cited by examiner

| NE | | 10 | 20 | ... | 100 |
|---|---|---|---|---|---|
| | 1000 | A | B | ... | C |
| | 1500 | D | E | ... | F |
| | ... | ... | ... | ... | ... |
| | 5000 | G | H | ... | I |

$Ta \geq Tath : \theta* = 0$

FIG. 3B $Ta < Tath$

CONTROL DEVICE FOR INTERNAL COMBUSTION ENGINE AND CONTROL METHOD FOR INTERNAL COMBUSTION ENGINE

INCORPORATION BY REFERENCE

The disclosure of Japanese Patent Application No. 2017-251355 filed on Dec. 27, 2017 including the specification, drawings and abstract is incorporated herein by reference in its entirety.

BACKGROUND

1. Technical Field

The present disclosure relates to a control device for an internal combustion engine and a control method for an internal combustion engine that are applied to an internal combustion engine including a plurality of cylinders, a fuel injection valve configured to supply fuel to each cylinder, an exhaust gas recirculation (EGR) passage configured to connect an exhaust passage and an intake passage, an EGR valve configured to adjust a flow rate of exhaust gas flowing from the exhaust passage into the intake passage through the EGR passage, and an air-fuel ratio sensor provided in the exhaust passage.

2. Description of Related Art

Japanese Unexamined Patent Application Publication No. 2011-226363 (JP 2011-226363 A) discloses a control device that determines the presence or absence of an imbalance abnormality based on an output waveform (a fluctuation amount of an air-fuel ratio) of an air-fuel ratio sensor provided in an exhaust passage. The control device of JP 2011-226363 A corrects an abnormality determination threshold according to an EGR gas effect amount based on an opening degree of an EGR control valve, or the like taking into consideration that change in degree of variation of an air-fuel ratio among the cylinders due to variation of an amount of EGR gas among the cylinders causes change in degree of imbalance among the cylinders.

SUMMARY

The inventor of the present disclosure found that, when an EGR rate is relatively large and when the EGR rate is zero, even though no imbalance abnormality occurs, the fluctuation amount of the air-fuel ratio is greater when the EGR rate is zero than when the EGR rate is relatively large. For this reason, in setting determination processing of an imbalance abnormality on an assumption of control for making the EGR rate greater than zero, when the EGR rate is relatively small, for example, zero, even though no imbalance abnormality actually occurs, erroneous determination is made that an imbalance abnormality occurs. That is, erroneous determination may be made that a degree of imbalance abnormality is greater than actual.

A first aspect of the present disclosure relates to a control device for an internal combustion engine. The internal combustion engine includes a plurality of cylinders, a fuel injection valve, an exhaust gas recirculation (EGR) passage, an EGR valve, and an air-fuel ratio sensor. The fuel injection valve is configured to supply fuel to each cylinder. The EGR passage is configured to connect an exhaust passage and an intake passage. The EGR valve is configured to adjust a flow rate of exhaust gas flowing from the exhaust passage into the intake passage through the EGR passage. The air-fuel ratio sensor is provided in the exhaust passage. The control device includes an electronic control unit. The electronic control unit is configured to execute determination processing for determining that a degree of imbalance abnormality is greater when a fluctuation amount of a detection value of the air-fuel ratio sensor is relatively large than when the fluctuation amount is relatively small. The degree of imbalance abnormality is a degree of variation of an air-fuel ratio in a combustion chamber of each of the cylinders when the fuel injection valve is operated to control air-fuel ratios in the cylinders to be equal to one another. The electronic control unit is configured to, in the determination processing, determine that the degree of imbalance abnormality is smaller when an EGR rate is relatively small than when the EGR rate is relatively large even though the fluctuation amount is the same. The EGR rate is a value obtained by dividing an amount of exhaust gas flowing from the EGR passage into the intake passage by an amount of air flowing into the intake passage.

According to the first aspect of the present disclosure, determination is made that the degree of imbalance abnormality is smaller when the EGR rate is relatively small than when the EGR rate is relatively large even though the fluctuation amount of the detection value of the air-fuel ratio sensor is the same. For this reason, it is possible to determine the degree of imbalance abnormality taking into consideration that the fluctuation amount of the detection value of the air-fuel ratio sensor is greater when the EGR rate is relatively small than when the EGR rate is relatively large even though the degree of imbalance abnormality is the same. Accordingly, it is possible to suppress erroneous determination that the degree of imbalance abnormality is greater than actual, such as erroneous determination that an imbalance abnormality occurs when no imbalance abnormality actually occurs.

A second aspect of the present disclosure relates to a control method for an internal combustion engine. The internal combustion engine includes a plurality of cylinders, a fuel injection valve, an EGR passage, an EGR valve, and an air-fuel ratio sensor. The fuel injection valve is configured to supply fuel to each cylinder. The EGR passage is configured to connect an exhaust passage and an intake passage. The EGR valve is configured to adjust a flow rate of exhaust gas flowing from the exhaust passage into the intake passage through the EGR passage. The air-fuel ratio sensor is provided in the exhaust passage. The control method includes: executing, by an electronic control unit, determination processing for determining that a degree of imbalance abnormality is greater when a fluctuation amount of a detection value of the air-fuel ratio sensor is relatively large than when the fluctuation amount is relatively small; and in the determination processing, determining, by the electronic control unit, that the degree of imbalance abnormality is smaller when an EGR rate is relatively small than when the EGR rate is relatively large even though the fluctuation amount is the same. The degree of imbalance abnormality is a degree of variation of an air-fuel ratio in a combustion chamber of each of the cylinders when the fuel injection valve is operated to control air-fuel ratios in the cylinders to be equal to one another. The EGR rate is a value obtained by dividing an amount of exhaust gas flowing from the EGR passage into the intake passage by an amount of air flowing into the intake passage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, a first embodiment of a control device for an internal combustion engine will be described referring to the drawings.

Figure 1:
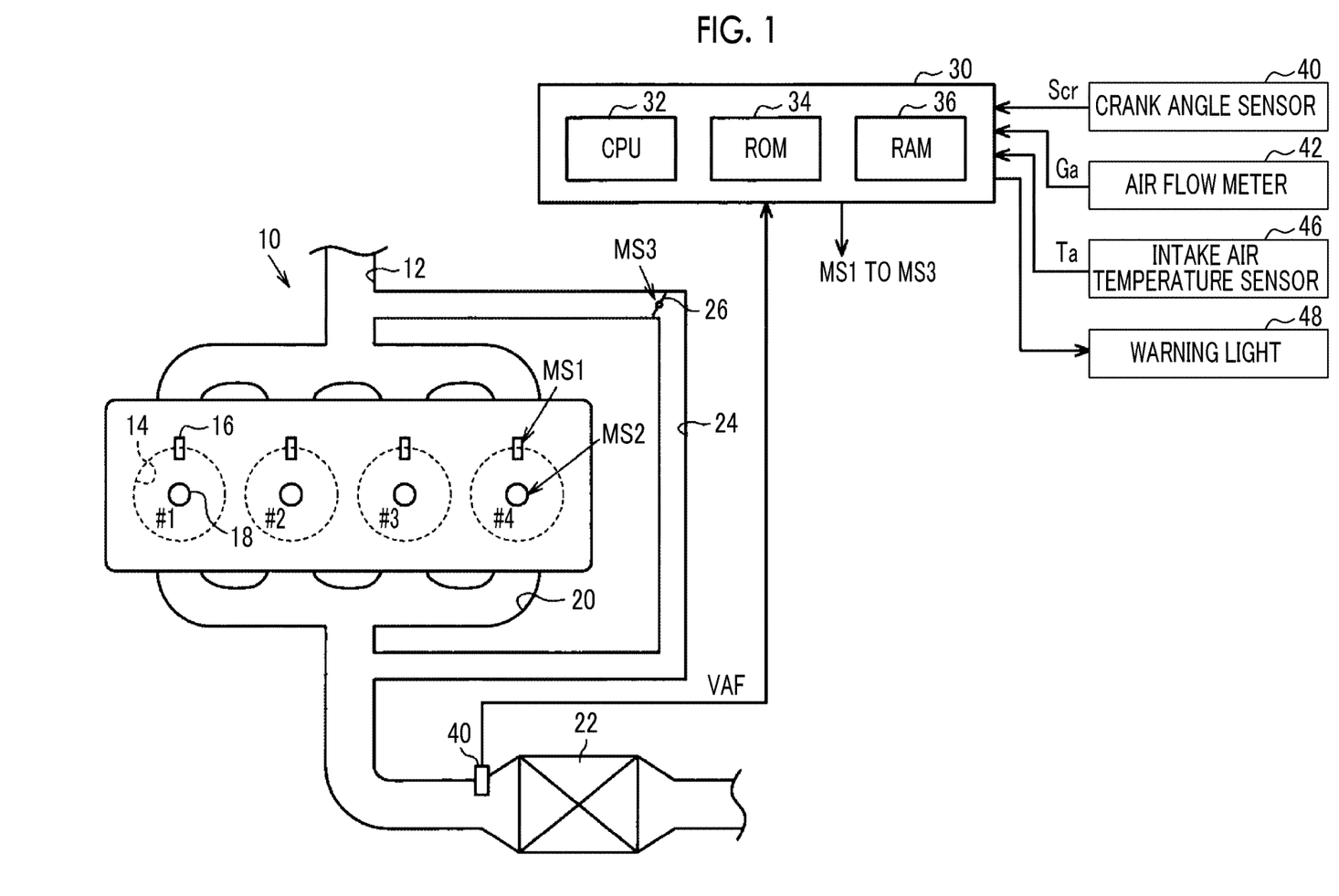
FIG. 1 is a diagram showing a control device according to a first embodiment and an internal combustion engine.

An internal combustion engine 10 shown in FIG. 1 is mounted in a vehicle. In the internal combustion engine 10, air sucked from an intake passage 12 flows into a combustion chamber 14 of each cylinder. Each of cylinders #1 to #4 are provided with a fuel injection valve 16 that injects fuel, and an ignition device 18 that causes spark discharge. In the combustion chamber 14, an air-fuel mixture of air and fuel is supplied for combustion, and the air-fuel mixture supplied for combustion is discharged as exhaust gas to the exhaust passage 20. The exhaust passage 20 is provided with a three-way catalyst 22 having an oxygen storage ability.

The exhaust passage 20 and the intake passage 12 are connected through an EGR passage 24, and the EGR passage 24 is provided with an EGR valve 26 that adjusts a flow passage cross-sectional area of the EGR passage 24. An electronic control unit 30 adapts the internal combustion engine 10 as a control target, and operates an operating unit of the internal combustion engine 10, such as the fuel injection valve 16, the ignition device 18, or the EGR valve 26, to control a control amount (torque, exhaust gas component, or the like) of the internal combustion engine 10. In this case, the electronic control unit 30 refers to an output signal VAF of an air-fuel ratio sensor 40 provided upstream of the three-way catalyst 22, an output signal Scr of the crank angle sensor 42, an intake air amount Ga to be detected by an air flow meter 44, and an intake air temperature Ta to be detected by an intake air temperature sensor 46. The electronic control unit 30 includes a central processing unit (CPU) 32, a read only memory (ROM) 34, and a random access memory (RAM) 36, and executes control of the control amount by the CPU 32 executing a program stored in the ROM 34.

Figure 2:
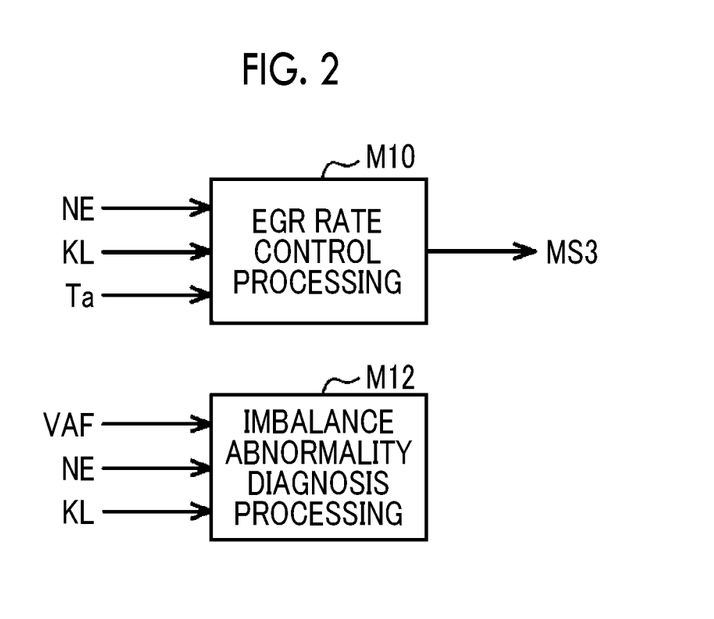
FIG. 2 is a block diagram showing a part of processing that the control device according to the first embodiment executes.
Figure 3A:
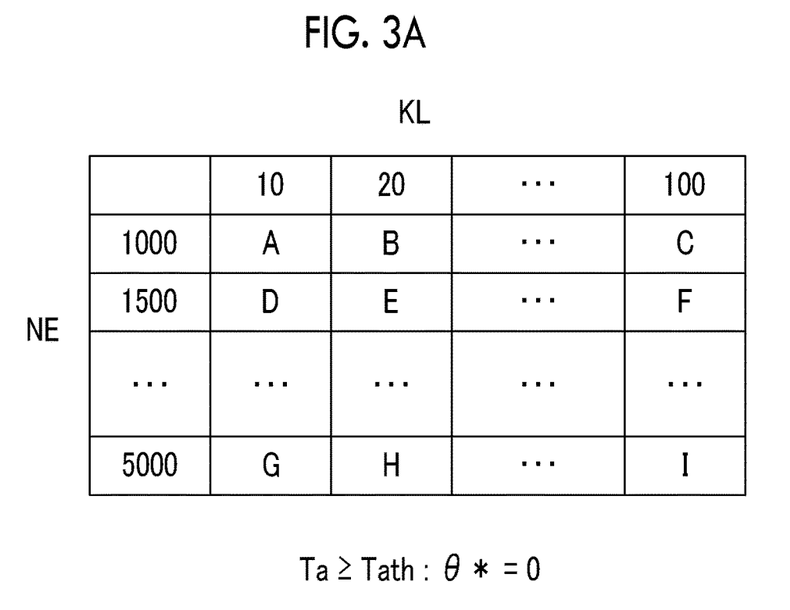
FIG. 3A is a table relating to setting of a target EGR rate and an operation signal in EGR control processing according to the first embodiment.
Figure 3B:
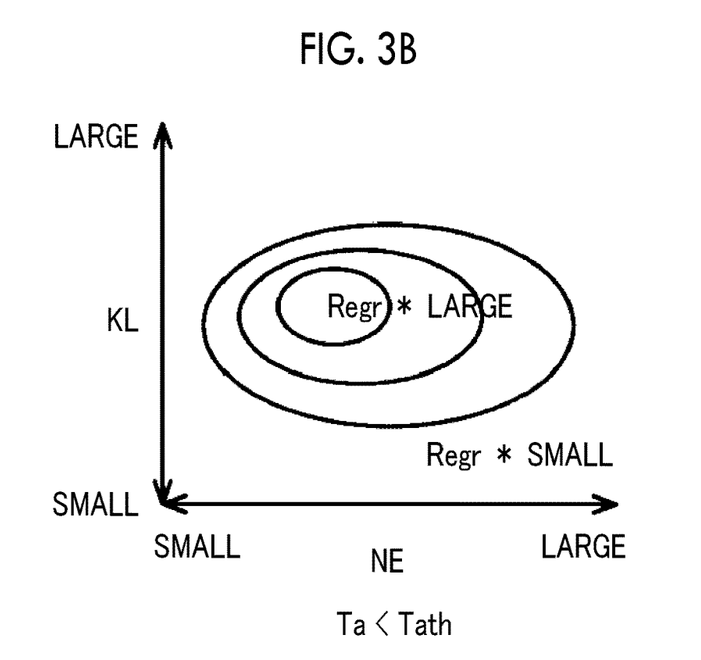
FIG. 3B is a graph relating to setting of the target EGR rate and an opening degree command value in the EGR control processing according to the first embodiment.

FIG. 2 shows a part of processing that is realized by the CPU 32 executing the program stored in the ROM 34. EGR rate control processing M10 is processing for outputting an operation signal MS3 to the EGR valve 26 in order to operate an opening degree of the EGR valve 26 based on an engine speed NE (hereinafter also referred as a rotation speed NE), a load factor KL, and the intake air temperature Ta. In detail, the EGR rate control processing M10 includes processing for setting an opening degree command value θ* of the EGR valve 26 to control an actual EGR rate Regr to a target EGR rate Regr* according to the rotation speed NE and the load factor KL for defining an operation point of the internal combustion engine 10 in an open loop and generating the operation signal MS3 such that the opening degree θ of the EGR valve 26 becomes the opening degree command value θ*. That is, in the embodiment, the opening degree command value θ* is defined according to the rotation speed NE and the load factor KL, and the target EGR rate Regr* is defined from the opening degree command value θ*. In other words, the CPU 32 does not necessarily actually handle the target EGR rate Regr* as a calculation parameter. The processing for setting the opening degree command value θ* according to the rotation speed NE and the load factor KL is processing for storing map data with the rotation speed NE and the load factor KL as input variables and the opening degree command value θ* as an output variable in the ROM 34 and performing map calculation of the opening degree command value θ* in the CPU 32. FIG. 3A illustrates map data, and FIG. 3B shows the target EGR rate Regr* to be defined by map data. In the embodiment, in order to reduce the amount of fuel consumption, the target EGR rate Regr* is set to an excessively large value within a range in which misfire does not occur.

Map data is set data of a discrete value of an input variable and a value of an output variable corresponding to each value of the input variable. For example, the map calculation may be processing for, when the value of the input variable coincides with any one of the values of the input variable of map data, obtaining the corresponding value of the output variable of map data as a calculation result, and when the value of the input variable does not coincide with any one of the values of the input variable of map data, obtaining a value obtained by interpolation of a plurality of values of the output variable included in map data as a calculation result.

The EGR rate Regr is a value obtained by dividing an amount of exhaust gas (EGR amount) flowing from the exhaust passage 20 into the intake passage 12 through the EGR passage 24 by the intake air amount Ga. The rotation speed NE is calculated based on the output signal Scr of the crank angle sensor 42 by the CPU 32. The load factor KL is a parameter indicating an amount of air that fills the combustion chamber 14, and is calculated based on the intake air amount Ga by the CPU 32. The load factor KL is the ratio of an inflow air amount per combustion cycle of one cylinder to a reference inflow air amount. The reference inflow air amount may be an amount that is variably set according to the rotation speed NE.

The EGR rate control processing M10 includes processing for, when the intake air temperature Ta becomes equal to or higher than a predetermined temperature Tath, setting the opening degree command value θ* of the EGR valve 26 to zero to avoid knocking, instead of employing the opening degree command value θ* defined based on the map calculation.

Imbalance abnormality diagnosis processing M12 is alarm processing for diagnosing the presence or absence of an imbalance abnormality based on the output signal VAF, the rotation speed NE, and the load factor KL, when the degree of imbalance abnormality is relatively large, determining that an imbalance abnormality occurs, operating a warning light 48 shown in FIG. 1, and requesting a user of the vehicle to take the vehicle to a repair shop and to have the vehicle repaired. Imbalance means that, when the fuel injection valves 16 of the cylinders #1 to #4 are operated to control the air-fuel ratios of the air-fuel mixture in all cylinders #1 to #4 to the same value, the air-fuel ratio of a specific cylinder is deviated to a rich side with respect to the same value.

Figure 4:
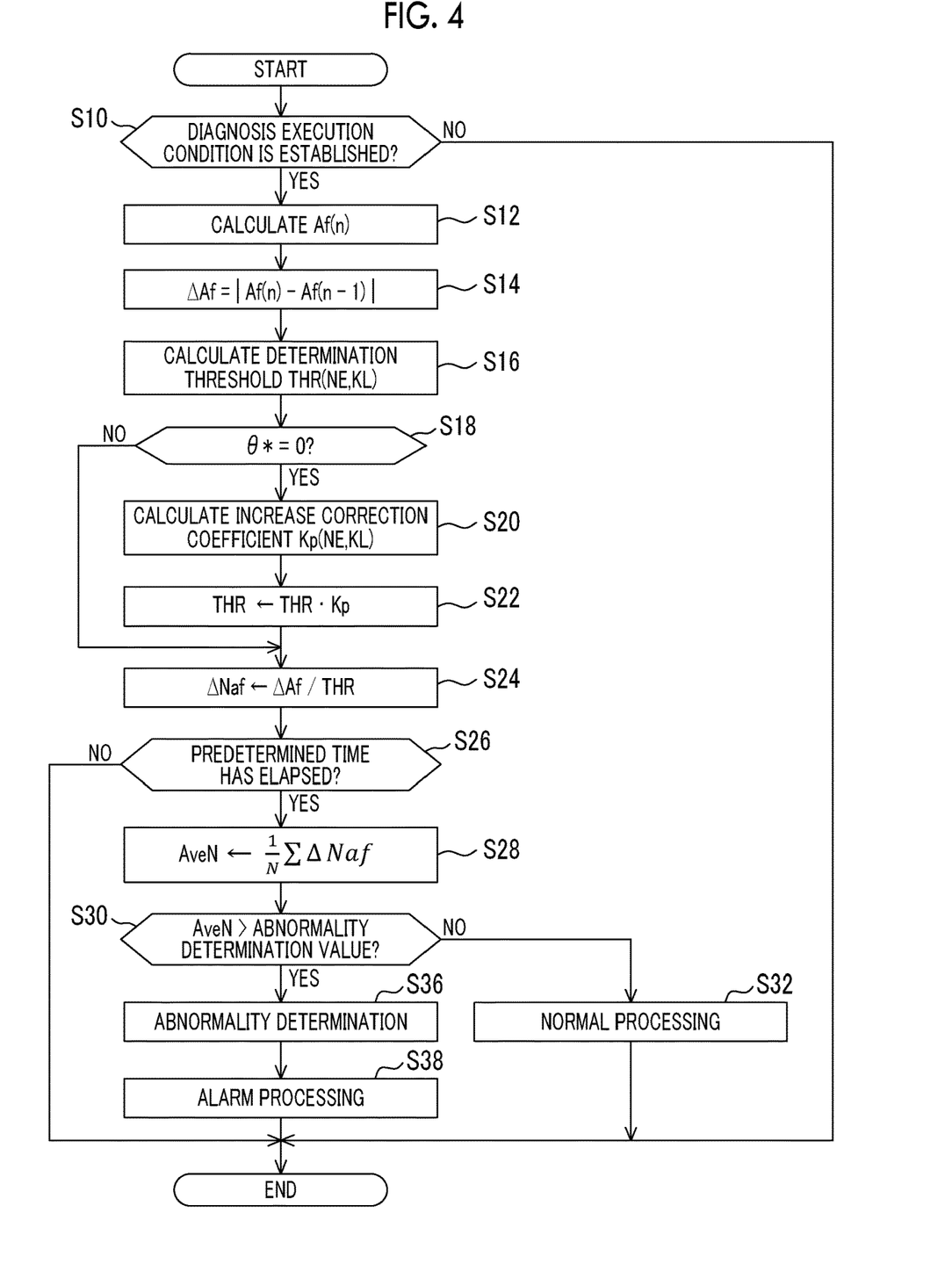
FIG. 4 is a flowchart showing a procedure of imbalance abnormality diagnosis processing according to the first embodiment.

FIG. 4 shows a procedure of the imbalance abnormality diagnosis processing M12. The processing shown in FIG. 4 is realized by the CPU 32 executing the program stored in the ROM 34 repeatedly in a predetermined cycle, for example. Hereinafter, a step number is expressed by a numeral with "S" attached to the head.

In a sequence of processing shown in FIG. 4, the CPU 32 first determines whether or not a diagnosis execution condition of the presence or absence of an imbalance abnormality is established (S10). For example, the diagnosis execution condition includes a condition that the rotation speed NE and the load factor KL enter a predetermined region. The condition is set to execute diagnosis in a case of a region where accuracy of diagnosis can be increased.

Figure 5:
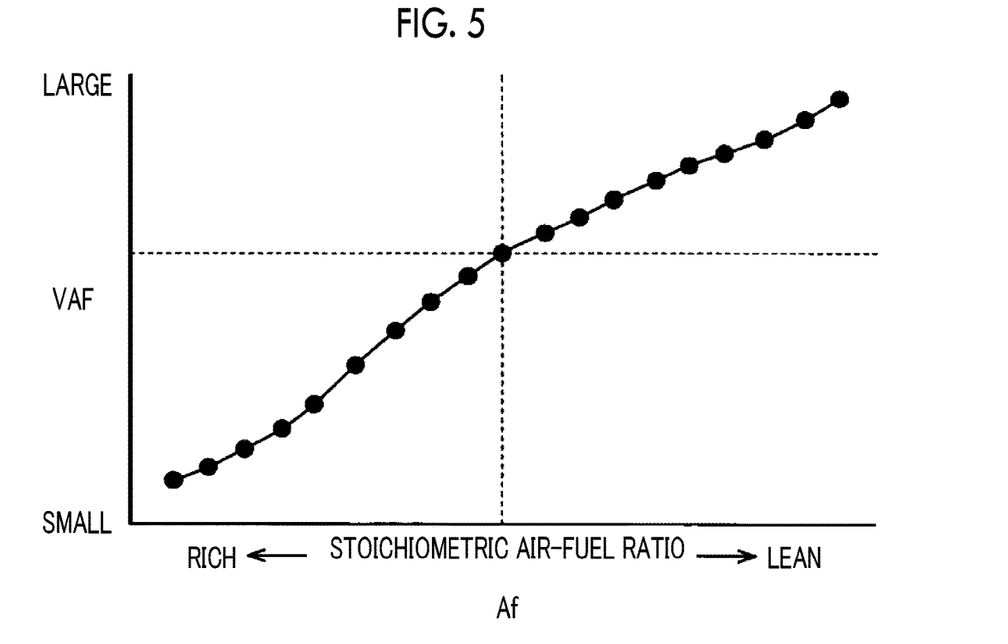
FIG. 5 is a graph showing the relationship between an output signal of an air-fuel ratio sensor and an air-fuel ratio according to the first embodiment.

When determination is made that the diagnosis execution condition is established (S10: YES), the CPU 32 calculates an air-fuel ratio Af(n) based on an output signal VAF(n) acquired in a present control cycle (S12). The variable n expresses a sampling number, "n" indicates the latest sampling value in the present control cycle, and "n−1" indicates a sampling value in a previous control cycle. In detail, map data with the output signal VAF as an input variable and an air-fuel ratio Af as an output variable shown in FIG. 5 is stored in the ROM 34, and map calculation of the air-fuel ratio Af is performed in the CPU 32. Returning to FIG. 4, the CPU 32 takes an absolute value of a value obtained by subtracting a previous air-fuel ratio Af(n−1) from a present air-fuel ratio Af(n), thereby calculating a fluctuation amount ΔAf (S14).

Figure 6:
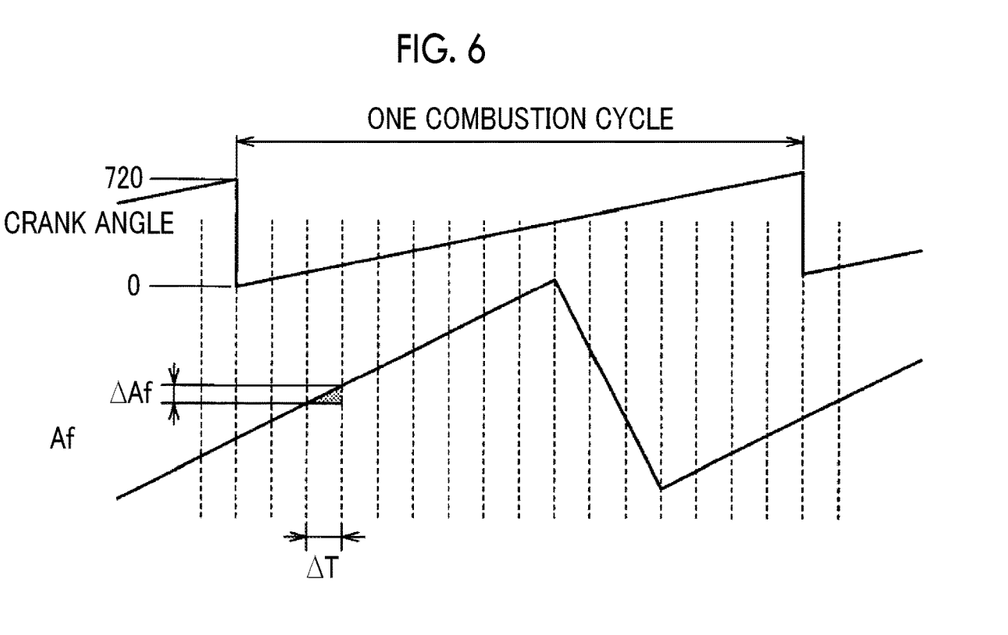
FIG. 6 is a time chart showing a calculation method of a fluctuation amount according to the first embodiment.

FIG. 6 illustrates the fluctuation amount ΔAf. The fluctuation amount ΔAf is a change amount of the air-fuel ratio Af per unit time ΔT as a control cycle of the sequence of processing shown in FIG. 4. Returning to FIG. 4, the CPU 32 calculates a determination threshold THR indicating the value of the fluctuation amount ΔAf during the normal time when no imbalance abnormality occurs (S16). In the embodiment, the determination threshold THR is the value of the fluctuation amount ΔAf that is assumed when the EGR rate Regr is controlled to the target EGR rate Regr* defined from map data shown in FIGS. 3A and 3B. In detail, in consideration that the fluctuation amount ΔAf fluctuates according to the rotation speed NE and the load factor KL, the CPU 32 calculates the determination threshold THR based on the rotation speed NE and the load factor KL. This calculation of the determination threshold THR can be realized by storing map data with the rotation speed NE and the load factor KL as input variables and the determination threshold THR as an output variable in the ROM 34 and performing map calculation of the determination threshold THR with the CPU 32.

The CPU 32 determines whether or not the opening degree command value θ* is zero (S18). This processing is processing for determining whether or not a state is brought in which the EGR rate Regr is not controlled to the target EGR rate Regr* defined from map data shown in FIGS. 3A and 3B with the intake air temperature Ta equal to or higher than the predetermined temperature Tath. When determination is made that the opening degree command value θ* is zero (S18: YES), the CPU 32 calculates an increase correction coefficient Kp of the determination threshold THR based on the rotation speed NE and the load factor KL (S20). The increase correction coefficient Kp is a value greater than "1", and thus, the determination threshold THR is increased and corrected. This is taking into consideration that the fluctuation amount ΔAf is greater when the EGR valve 26 is closed such that exhaust gas from the EGR passage 24 is not introduced into the combustion chamber 14 than when the EGR valve 26 is opened such that exhaust gas is introduced from the EGR passage 24 into the combustion chamber 14.

Figure 7:
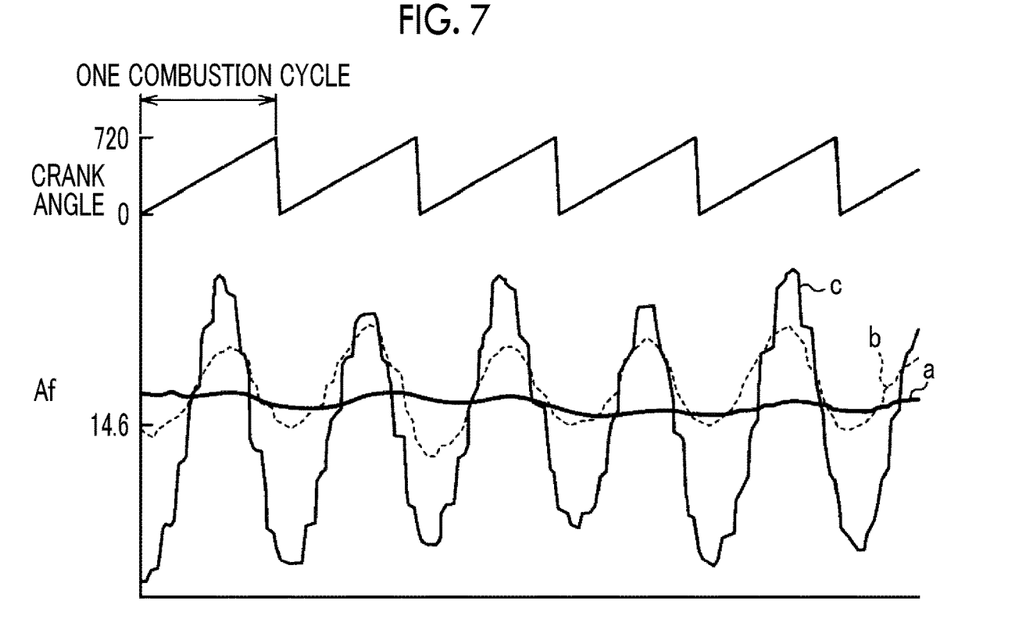
FIG. 7 is a time chart showing behavior of an air-fuel ratio according to the first embodiment.

In FIG. 7, transition of the air-fuel ratio Af during the normal time is indicated by a thick line a, transition of the air-fuel ratio Af in an imbalance abnormality when the EGR rate Regr is controlled to the target EGR rate Regr* defined from map data shown in FIGS. 3A and 3B is indicated by a broken line b, and transition of the air-fuel ratio Af in an imbalance abnormality when the EGR valve 26 is closed is indicated by a solid line c.

In the processing of S20 shown in FIG. 4, the rotation speed NE and the load factor KL are parameters for specifying the target EGR rate Regr* defined from map data shown in FIGS. 3A and 3B. That is, the determination threshold THR calculated in the processing of S16 is adapted to the value of the fluctuation amount ΔAf when the EGR rate Regr is controlled to the target EGR rate Regr* based on map data shown in FIGS. 3A and 3B and when no imbalance abnormality occurs. For this reason, in ascertaining the difference from the fluctuation amount ΔAf when the EGR rate Regr is zero, information relating to the target EGR rate Regr* defined from map data shown in FIGS. 3A and 3B is needed. In the embodiment, as described above, in consideration that the target EGR rate Regr* is not a parameter that the CPU 32 actually handles, the increase correction coefficient Kp is calculated with reference to the rotation speed NE and the load factor KL. In the next step, the CPU 32 multiples the determination threshold THR calculated in the processing of S16 by the increase correction coefficient Kp, thereby correcting the determination threshold THR (S22).

When the processing of S22 is completed or when negative determination is made in the processing of S18, the CPU 32 substitutes a value obtained by dividing the fluctuation amount ΔAf by the determination threshold THR in a comparison parameter ΔNaf (S24). In the next step, the CPU 32 determines whether or not a predetermined period having a length capable of sampling the comparison parameter ΔNaf multiple times has elapsed (S26). When determination is made that the predetermined period has elapsed (S26: YES), the CPU 32 calculates an average value AveN of the comparison parameter ΔNaf calculated within the predetermined period (S28). In the next step, the CPU 32 determines whether or not the average value AveN is greater than an abnormality determination value (S30). This processing is processing for determining whether or not the fluctuation amount ΔAf is greater than the determination threshold THR by a predetermined value or more. That is, for example, when the abnormality determination value is set to "1", and when an average value of the fluctuation amount ΔAf is greater than an average value of the determination threshold THR, the average value AveN is greater than the abnormality determination value, and this means that the fluctuation amount ΔAf is greater than the determination threshold THR. For example, when the abnormality determination value is set to "1.2", and when the average value of the fluctuation amount $\Delta Af$ is "1.2" times or more the average value of the determination threshold THR, the average value AveN is greater than the abnormality determination value, and this means that the fluctuation amount $\Delta Af$ is greater than the determination threshold THR by "1.2" times or more.

When determination is made that the average value AveN is equal to or less than the abnormality determination value (S30: NO), the CPU 32 determines to be normal (S32). In contrast, when determination is made that the average value AveN is greater than the abnormality determination value (S30: YES), the CPU 32 determines to be abnormal (S36), and executes the above-described alarm processing (S38).

When the processing of S32 and S38 is completed or when negative determination is made in the processing of S10 and S26, the CPU 32 ends the sequence of processing shown in FIG. 4 once. The operations and effects of the embodiment will be described.

Figure 8:
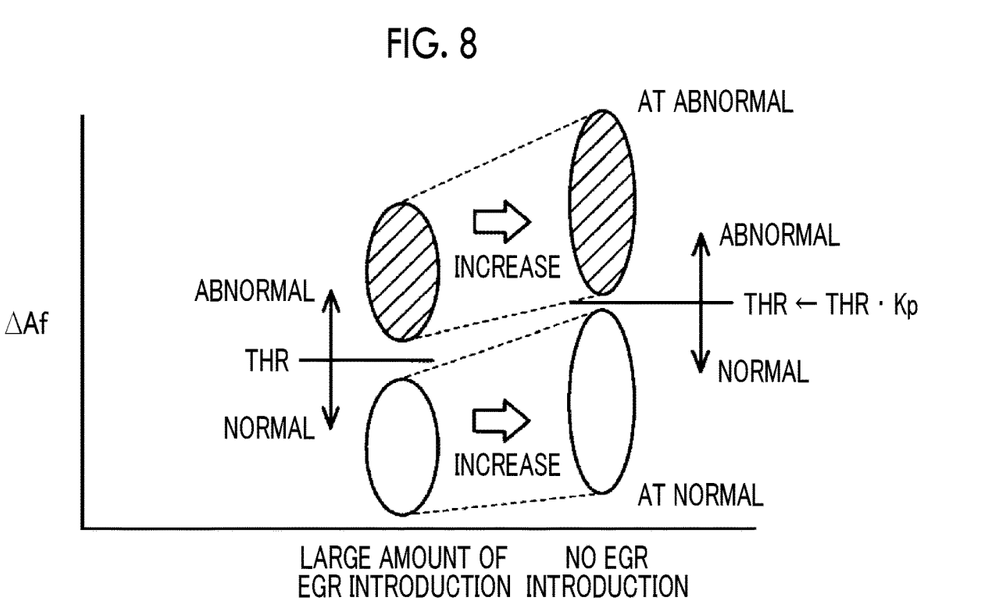
FIG. 8 is diagram showing effects of the first embodiment.

When the EGR rate Regr is controlled to the target EGR rate Regr* defined from map data shown in FIGS. 3A and 3B, as shown in FIG. 8, the CPU 32 determines whether or not the fluctuation amount $\Delta Af$ is greater than the determination threshold THR defined based on the fluctuation amount $\Delta Af$ during the normal time by a predetermined value or more on an assumption that the control is performed. In contrast, when the EGR valve 26 is closed, as shown in FIG. 8, the CPU 32 determines whether or not the fluctuation amount $\Delta Af$ is greater than a value obtained by increasing and correcting the determination threshold THR with the increase correction coefficient Kp by a predetermined value or more. With this, it is possible to suppress erroneous determination that an imbalance abnormality occurs because the fluctuation amount $\Delta Af$ is greater than the determination threshold THR by the predetermined value or more even though no imbalance abnormality occurs when the EGR valve 26 is closed.

According to the embodiment described above, the following functional effects are further obtained.

1) In the processing of S16, the determination threshold THR is variably set according to the rotation speed NE and the load factor KL. With this, since it is possible to set the determination threshold THR taking into consideration that the fluctuation amount $\Delta Af$ depends on not only the degree of imbalance abnormality but also the rotation speed NE or the load factor KL, it is possible to determine the presence or absence of an imbalance abnormality with higher accuracy.

2) Determination is made whether or not the fluctuation amount $\Delta Af$ is greater than the determination threshold THR by the predetermined value or more based on the magnitude of the average value AveN of the comparison parameter $\Delta Naf$ in the predetermined period obtained by quantifying the relative magnitude relationship between the fluctuation amount $\Delta Af$ and the determination threshold THR. With this, it is possible to increase resistance to noise of the determination processing of the presence or absence of an imbalance abnormality compared to when the fluctuation amount $\Delta Af$ and the determination threshold THR are simply compared in magnitude.

Second Embodiment

Hereinafter, a second embodiment will be described referring to the drawings while focusing on the difference from the first embodiment.

Figure 9:
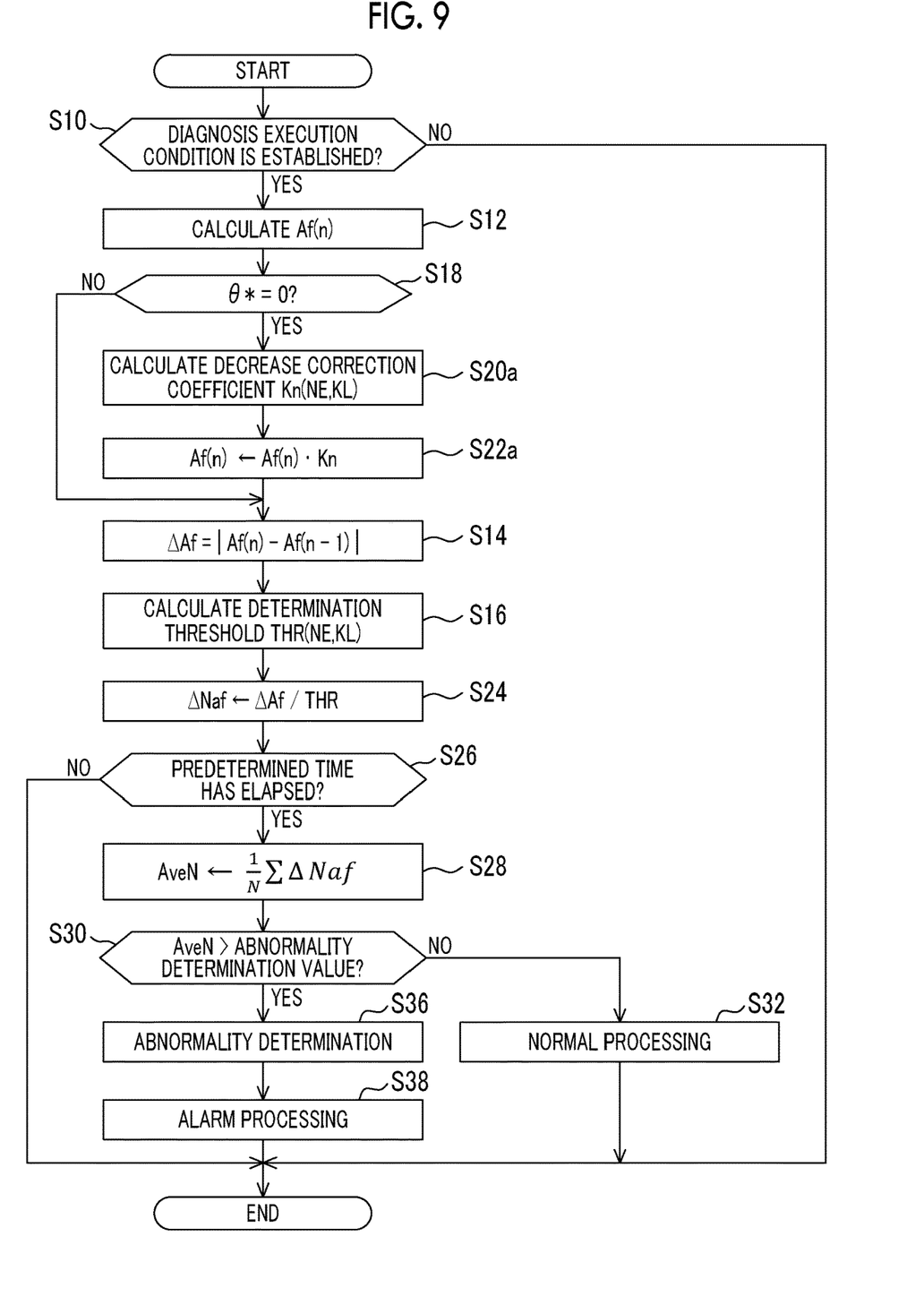
FIG. 9 is a flowchart showing a procedure of imbalance abnormality diagnosis processing according to a second embodiment.

FIG. 9 shows a procedure of imbalance abnormality diagnosis processing M12 according to the embodiment. The processing shown in FIG. 9 is realized by the CPU 32 executing the program stored in the ROM 34 repeatedly in a predetermined cycle, for example. In FIG. 9, the processing corresponding to the processing shown in FIG. 4 is represented by the same step number for convenience.

In a sequence of processing shown in FIG. 9, when the processing of S12 is completed, the CPU 32 determines whether or not the opening degree command value $\theta*$ is zero (S18). When determination is made that the opening degree command value $\theta*$ is zero (S18: YES), the CPU 32 calculates a decrease correction coefficient Kn based on the rotation speed NE and the load factor KL (S20a). The decrease correction coefficient Kn is a parameter for decreasing and correcting the air-fuel ratio Af(n) to decrease and correct the fluctuation amount $\Delta Af$, and is smaller than "1". The rotation speed NE and the load factor KL are parameters for specifying the target EGR rate Regr*.

The CPU 32 multiplies the air-fuel ratio Af(n) by the decrease correction coefficient Kn, thereby decreasing and correcting the air-fuel ratio Af(n) (S22a). When negative determination is made in S18 or when the processing of S22a is completed, the CPU 32 progresses to the processing of S14. In the processing of S14, the fluctuation amount $\Delta Af$ is calculated to be a value smaller when affirmative determination is made in S18 and the processing of S22a is executed than when negative determination is made in S18 even though the difference between the air-fuel ratios Af(n), Af(n−1) acquired in the processing of S12 is the same. The above-described processing is processing for compensating that the fluctuation amount $\Delta Af$ is greater when the opening degree command value $\theta*$ of the EGR valve 26 is zero than when the EGR rate Regr is controlled to the target EGR rate Regr* defined from map data shown in FIGS. 3A and 3B even though the degree of imbalance abnormality is the same.

When the processing of S14 is completed, the CPU 32 calculates the determination threshold THR (S16), and divides the fluctuation amount $\Delta Af$ by the determination threshold THR, thereby calculating the comparison parameter $\Delta Naf$ (S24).

The processing of S12 to S36 is an example of determination processing. The processing of S24 to S30 is an example of comparison determination processing. The processing of S18 to S22 in FIG. 4 is an example of EGR rate reflection processing. The processing of S24 to S30 is an example of comparison determination processing. The processing of S18, S20a, and S22a in FIG. 9 is an example of EGR rate reflection processing. The processing of S16 is an example of threshold variable processing. The processing of S24 to S28 is an example of average value calculation processing. The processing of S30 is an example of abnormality determination processing.

Other Embodiments

The embodiment can be carried out in modified forms as follows. The embodiment and the following modification examples can be carried out in combination within a range in which a technical contradiction does not occur.

Fluctuation Amount

In the above-described embodiment, although the fluctuation amount of the detection value of the air-fuel ratio sensor 40 is quantified as the change amount (absolute value) of the air-fuel ratio Af per unit time $\Delta T$, the present disclosure is not limited thereto, and for example, the fluctuation amount of the detection value of the air-fuel ratio sensor 40 may be limited to a value of the change amount of the air-fuel ratio Af per unit time ΔT when the change amount is positive or may be limited to an absolute value when of change amount when the change amount is negative. In addition, the fluctuation amount of the detection value of the air-fuel ratio sensor 40 may be a greater value of the value of the change amount of the air-fuel ratio Af per unit time ΔT when the change amount is positive and the absolute value of the change amount when the change amount is negative.

In the above-described embodiment, although the air-fuel ratio Af is calculated from the output signal VAF and the fluctuation amount of the detection value of the air-fuel ratio sensor 40 is quantified as the change amount (absolute value) of the air-fuel ratio Af per unit time ΔT, the present disclosure is not limited thereto. For example, the fluctuation amount of the detection value of the air-fuel ratio sensor 40 may be quantified as a change amount (absolute value) of the output signal VAF per unit time ΔT.

In the above-described embodiment, although the fluctuation amount of the detection value of the air-fuel ratio sensor 40 is quantified as the change amount (absolute value) of the air-fuel ratio Af per unit time ΔT, the present disclosure is not limited thereto. For example, the difference between the maximum value and the minimum value of the air-fuel ratio Af in one combustion cycle may be used.

In the above-described embodiment, although it is assumed that the unit time ΔT is a fixed value, the present disclosure is not limited thereto. For example, the unit time ΔT may be shorter when the rotation speed NE is relatively high than when the rotation speed NE is relatively low.

Comparison Determination Processing

In the above-described embodiment, although determination is made whether or not the fluctuation amount ΔAf is greater than the determination threshold THR by the predetermined value or more with magnitude comparison of the average value AveN of the comparison parameter ΔNaf in the predetermined period and the abnormality determination value, the present disclosure is not limited thereto. For example, determination may be made whether or not the fluctuation amount ΔAf is greater than the determination threshold THR by the predetermined value or more with single magnitude comparison of the comparison parameter ΔNaf and the abnormality determination value. In this case, for example, when determination is made that the fluctuation amount ΔAf is greater than the determination threshold THR by the predetermined value or more, determination may be made to be abnormal temporarily, when the number of times of temporary determination to be abnormal in the predetermined period is equal to or greater than a predetermined value, determination may be made that an imbalance abnormality occurs, and the alarm processing may be executed.

For example, as described in a column "Threshold Variable Processing" described below, when the determination threshold THR is not variably set according to a load, for example, the air-fuel ratio Af may be corrected according to the load. The correction described above can be realized by, for example, including processing for multiplying the air-fuel ratio Af(n) by a correction coefficient reflecting the difference of the fluctuation amount ΔAf according to the rotation speed NE and the load factor KL between the processing of S12 and the processing of S18 in the processing of FIG. 9.

Threshold Variable Processing

In the above-described embodiment, although the determination threshold THR is variably set according to the rotation speed NE and the load factor KL, the present disclosure is not limited thereto. For example, as the load of the internal combustion engine 10, a cylinder filling air amount itself may be used or an injection amount to be defined according to the cylinder filling air amount for controlling an air-fuel ratio to a target air-fuel ratio may be used instead of the load factor KL.

In the above-described embodiment, although the determination threshold THR is variably set according to the rotation speed NE and the load, the present disclosure is not limited thereto. For example, as described in the column "Fluctuation Amount" described above, the determination threshold THR may be variably set according to the load solely, instead of setting the unit time ΔT for calculating the fluctuation amount ΔAf to be shorter when the rotation speed NE is relatively high than when the rotation speed NE is relatively low.

Of course, variably setting of the determination threshold THR according to the load is optional.

EGR Rate Reflection Processing

In the processing of S20 of FIG. 4, although the increase correction coefficient Kp is calculated based on the rotation speed NE and the load factor KL, the present disclosure is not limited thereto. For example, processing for calculating the target EGR rate Regr* each time may be executed, and the increase correction coefficient Kp may be calculated based on the target EGR rate Regr*. In particular, as described in a column "EGR Rate Control Processing" described below, in executing processing for making the EGR rate Regr closer to the target EGR rate Regr* defined according to the rotation speed NE and the load factor KL when the temperature becomes higher, it is effective to calculate the increase correction coefficient Kp based on the target EGR rate Regr*.

In the processing of S20a of FIG. 9, although the decrease correction coefficient Kn is calculated based on the rotation speed NE and the load factor KL, the present disclosure is not limited thereto. For example, processing for calculating the target EGR rate Regr* each time may be executed, and the decrease correction coefficient Kn may be calculated based on the target EGR rate Regr*. In particular, as described in the column "EGR Rate Control Processing" described below, in executing the processing for making the EGR rate Regr closer to the target EGR rate Regr* defined according to the rotation speed NE and the load factor KL when the temperature becomes higher, it is effective to calculate the decrease correction coefficient Kn based on the target EGR rate Regr*.

Determination Processing

In the above-described embodiment, although determination is made whether or not the degree of imbalance abnormality is large to such an extent that the alarm processing is needed, the present disclosure is not limited thereto. For example, in regard to the degree of imbalance abnormality of a level without needing the alarm processing, a multiple-stage or continuous degree may be determined. This may be, for example, processing for setting the magnitude of the determination threshold THR to the magnitude of the fluctuation amount ΔAf when no imbalance abnormality occurs and determining that the degree of imbalance abnormality is greater when a degree by which the fluctuation amount ΔAf exceeds the determination threshold THR is relatively large than when the degree is relatively small. In this case, it is desirable that an electrically rewritable nonvolatile memory is provided in the electronic control unit 30, and the degree of imbalance abnormality is stored and updated as a learning value in the nonvolatile memory. The learning value can be used in processing for correcting a target value to a rich side, for example, in a controller that performs feedback control of the air-fuel ratio Af to the target value. This is setting for compensating that the air-fuel ratio Af is richer than an actual air-fuel ratio when an imbalance abnormality occurs and controlling the air-fuel ratio to the target air-fuel ratio.

EGR Rate Control Processing

In the above-described embodiment, although the opening degree θ of the EGR valve 26 is operated to control the EGR rate Regr to the target EGR rate Regr* according to the rotation speed NE and the load factor KL in an open loop, the present disclosure is not limited thereto. For example, the target EGR rate Regr* may be set according to the rotation speed NE and the load factor KL, a pressure sensor may be provided in the intake passage 12, the EGR rate Regr may be calculated based on a detection value of the pressure sensor, and the opening degree θ of the EGR valve 26 may be operated to perform feedback control of the EGR rate Regr to the target EGR rate Regr*.

In the above-described embodiment, although processing for forcibly making the target EGR rate Regr* zero without making the EGR rate Regr follow the target EGR rate Regr* defined according to the rotation speed NE and the load factor KL is executed when the intake air temperature Ta is higher than a predetermined temperature, the present disclosure is not limited thereto. For example, when a temperature of a coolant of the internal combustion engine 10 is equal to or lower than a predetermined temperature, the processing for forcibly making the target EGR rate Regr* zero may be executed. For example, in an internal combustion engine 10 including a canister that traps fuel vapor in a fuel tank, when a purge rate obtained by dividing a flow rate of fuel vapor flowing from the canister into the intake passage 12 by the intake air amount Ga is equal to or greater than a predetermined rate, the processing for forcibly making the target EGR rate Regr* zero may be executed.

The present disclosure is not limited to setting the target EGR rate Regr* to either of a value greater than zero according to the rotation speed NE and the load factor KL or zero. For example, when the temperature of the coolant of the internal combustion engine 10 is equal to or lower than a predetermined temperature, the processing for forcibly making the target EGR rate Regr* zero may be executed, and when the temperature of the coolant of the internal combustion engine 10 is higher than the predetermined temperature and equal to or lower than a specified temperature, the processing for making the EGR rate Regr closer to the target EGR rate Regr* defined according to the rotation speed NE and the load factor KL when the temperature becomes higher may be executed.

Alarm Processing

In the above-described embodiment, although the processing for operating a device (warning light 48) that outputs visual information is illustrated as the alarm processing for alarming to the effect that there is an abnormality, the present disclosure is not limited thereto, and for example, processing for operating a device that outputs auditory information, such as warning sound, may be executed. That is, as an alarm device, a device that outputs at least one of visual information and auditory information may be provided.

Electronic Control Unit

The electronic control unit is not limited to an electronic control unit that includes the CPU 32 and the ROM 34, and executes software processing. For example, a dedicated hardware circuit (for example, an ASIC or the like) that executes hardware processing on at least a part of the software processing may be provided. That is, the electronic control unit may have any one of the following configurations (a) to (c). (a) A processing device that executes all processing according to a program, and a program storage device, such as a ROM, that stores the program are provided. (b) A processing device that executes a part of the processing according to a program, a program storage device, and a dedicated hardware circuit that executes remaining processing are provided. (c) A dedicated hardware circuit that executes all processing is provided. There may be a plurality of software processing circuits including the processing device and the program storage device or a plurality of dedicated hardware circuits. That is, the processing may be executed by a processing circuit including at least one of one or a plurality of software processing circuits and one or a plurality of dedicated hardware circuits.

Internal Combustion Engine

The internal combustion engine is not limited to a four-cylinder internal combustion engine. For example, an in-line six-cylinder internal combustion engine may be adapted. The fuel injection valve is not limited to a fuel injection valve that injects fuel into the combustion chamber 14, and for example, a fuel injection valve that injects fuel into the intake passage 12 may be adapted.

In the control device according to the first aspect of the present disclosure, the determination processing may include comparison determination processing for determining whether or not the fluctuation amount is greater than a determination threshold by a predetermined value or more and EGR rate reflection processing for setting the determination threshold to a greater value when the EGR rate is relatively small than when the EGR rate is relatively large. The electronic control unit may be configured to determine that the degree of imbalance abnormality is large when determination is made in the comparison determination processing that the fluctuation amount is greater than the determination threshold by the predetermined value or more.

With the configuration, in consideration that the fluctuation amount in which determination should be made that the degree of imbalance abnormality is large when the EGR rate is relatively small is greater than the fluctuation amount in which determination should be made that the degree of imbalance abnormality is large when the EGR rate is relatively large, the determination threshold to be a comparison target with the fluctuation amount is set to a greater value when the EGR rate is relatively small than when the EGR rate is relatively large.

In the control device according to the first aspect of the present disclosure, the determination processing may include comparison determination processing for determining whether or not the fluctuation amount is greater than a determination threshold by a predetermined value or more and EGR rate reflection processing for, prior to execution of the comparison determination processing, correcting the fluctuation amount to be a comparison target with the determination threshold to be a smaller value when the EGR rate is relatively small than when the EGR rate is relatively large. The electronic control unit may be configured to determine that the degree of imbalance abnormality is large when determination is made in the comparison determination processing that the fluctuation amount is greater than the determination threshold by the predetermined value or more.

With the configuration, in consideration that the fluctuation amount in which determination should be made that the degree of imbalance abnormality is large when the EGR rate is relatively small is greater than the fluctuation amount in which determination should be made that the degree of imbalance abnormality is large when the EGR rate is relatively large, the fluctuation amount to be a comparison target with the determination threshold is corrected to become a smaller value when the EGR rate is relatively small than when the EGR rate is relatively large.

In the control device according to the first aspect of the present disclosure, the determination processing may include threshold variable processing for variably setting the determination threshold according to a load of the internal combustion engine. The magnitude of the fluctuation amount depends on not only the degree of imbalance abnormality but also the load. For this reason, when the determination threshold is set to a value that does not depend on the load, it is not possible to determine that the degree of imbalance abnormality is large when the degree of imbalance abnormality is large, or erroneous determination may be made that the degree of imbalance abnormality is large when the degree of imbalance abnormality is actually small. In contrast, according to the first aspect of the present disclosure, the determination threshold is variably set according to the load, whereby it is possible to determine whether or not the degree of imbalance abnormality is large with higher accuracy compared to when the determination threshold is not variably set.

In the control device according to the first aspect of the present disclosure, the threshold variable processing may include processing for correcting the determination threshold according to a rotation speed of a crankshaft of the internal combustion engine, in addition to the load of the internal combustion engine.

The magnitude of the fluctuation amount may depend on not only the degree of imbalance abnormality but also the rotation speed. For this reason, when the determination threshold is set to a value that does not depend on the rotation speed, it is not possible to determine that the degree of imbalance abnormality is large when the degree of imbalance abnormality is large, or erroneous determination may be made that the degree of imbalance abnormality is large when the degree of imbalance abnormality is actually small. In contrast, according to the first aspect of the present disclosure, the determination threshold is variably set according to the rotation speed, whereby it is possible to determine whether or not the degree of imbalance abnormality is large with higher accuracy compared to when the determination threshold is not variably set.

In the control device according to the first aspect of the present disclosure, the comparison determination processing may include average value calculation processing for calculating an average value in a predetermined period of a comparison parameter obtained by quantifying a relative magnitude relationship between the fluctuation amount and the determination threshold and abnormality determination processing for determining whether or not the fluctuation amount is greater than the determination threshold by the predetermined value or more based on a magnitude of the average value.

According to the first aspect of the present disclosure, the average value in the predetermined period is used, whereby it is possible to increase resistance to noise of the determination processing regarding whether or not the degree of imbalance abnormality is large. When the average value of the fluctuation amount is used, fluctuation of the EGR rate, the load, or the like in the predetermined period causes fluctuation of a minimum value of the fluctuation amount in which determination should be made that degree of imbalance abnormality is large. When the electronic control unit determines that the degree of imbalance abnormality is large when determination is made in the comparison determination processing that the fluctuation amount is greater than the determination threshold by the predetermined value or more, comparison of the average value of the fluctuation amount in the predetermined period with a determination threshold at a single timing may cause degradation of determination accuracy. For this reason, when this configuration is provided, the above-described configuration in which the average value of the comparison parameter obtained by quantifying the relative magnitude relationship between the fluctuation amount and the determination threshold is used, instead of comparison of the magnitude of the average value of the fluctuation amount in the predetermined period and the magnitude of the determination threshold, is particularly effective.

In the control device according to the first aspect of the present disclosure, the electronic control unit may be configured to execute EGR rate control processing for selectively controlling the EGR rate to either of zero or a value greater than zero even though an operation point of the internal combustion engine is the same. The electronic control unit may be configured to, in the determination processing, determine that the degree of imbalance abnormality is smaller when the EGR rate is zero than when the EGR rate is greater than zero even though the fluctuation amount is the same.

What is claimed is:

1. A control device for an internal combustion engine including a plurality of cylinders, a fuel injection valve configured to supply fuel to each cylinder, an exhaust gas recirculation passage configured to connect an exhaust passage and an intake passage, an exhaust gas recirculation valve configured to adjust a flow rate of exhaust gas flowing from the exhaust passage into the intake passage through the exhaust gas recirculation passage, and an air-fuel ratio sensor provided in the exhaust passage, the control device comprising an electronic control unit configured to:
  correct a fluctuation amount of a detection value of the air-fuel ratio sensor to be a comparison target with a determination threshold that is a smaller value when an exhaust gas recirculation rate is relatively small compared to when the exhaust gas recirculation rate is relatively large,
  determine whether or not the fluctuation amount is greater than the determination threshold by a predetermined value or more, and
  determine that a degree of imbalance abnormality is large when determination is made that the fluctuation amount is greater than the determination threshold by the predetermined value or more, wherein
  the degree of imbalance abnormality is a variation of an air-fuel ratio in a combustion chamber of each of the cylinders when the fuel injection valve is operated to control air-fuel ratios in the cylinders to be equal to one another; and
  the degree of imbalance abnormality is smaller when the exhaust gas recirculation rate is relatively small compared to when the exhaust gas recirculation rate is relatively large even though the fluctuation amount is the same, the exhaust gas recirculation rate being obtained by dividing an amount of exhaust gas flowing from the exhaust gas recirculation passage into the intake passage by an amount of air flowing into the intake passage.

2. The control device according to claim 1, wherein the electronic control unit configured to variably set the determination threshold according to a load of the internal combustion engine.

3. The control device according to claim 2, wherein the electronic control unit configured to correct the determination threshold according to a rotation speed of a crankshaft of the internal combustion engine, in addition to the load of the internal combustion engine.

4. The control device according to claim 1, wherein the electronic control unit configured to
- calculate an average value in a predetermined period of a comparison parameter obtained by quantifying a relative magnitude relationship between the fluctuation amount and the determination threshold, and
- determine whether or not the fluctuation amount is greater than the determination threshold by the predetermined value or more based on a magnitude of the average value.

5. The control device according to claim 1, wherein:
- the electronic control unit is configured to selectively control the exhaust gas recirculation rate to be either zero or a value greater than zero even though an operation point of the internal combustion engine is the same; and
- the electronic control unit is configured to determine that the degree of imbalance abnormality is smaller when the exhaust gas recirculation rate is zero than when the exhaust gas recirculation rate is greater than zero even though the fluctuation amount is the same.

6. A control method for an internal combustion engine including a plurality of cylinders, a fuel injection valve configured to supply fuel to each cylinder, an exhaust gas recirculation passage configured to connect an exhaust passage and an intake passage, an exhaust gas recirculation valve configured to adjust a flow rate of exhaust gas flowing from the exhaust passage into the intake passage through the exhaust gas recirculation passage, and an air-fuel ratio sensor provided in the exhaust passage, the control method comprising:
- correcting, with an electronic control unit, a fluctuation amount of a detection value of the air-fuel ratio sensor to be a comparison target with a determination threshold that is a smaller value when an exhaust gas recirculation rate is relatively small compared to when the exhaust gas recirculation rate is relatively large,
- determine, with the electronic control unit, whether or not the fluctuation amount is greater than the determination threshold by a predetermined value or more, and
- determining, with the electronic control unit, that a degree of imbalance abnormality is large when determination is made that the fluctuation amount is greater than the determination threshold by the predetermined value or more, wherein
- the degree of imbalance abnormality is a variation of an air-fuel ratio in a combustion chamber of each of the cylinders when the fuel injection valve is operated to control air-fuel ratios in the cylinders to be equal to one another; and
- the degree of imbalance abnormality is smaller when the exhaust gas recirculation rate is relatively small compared to when the exhaust gas recirculation rate is relatively large even though the fluctuation amount is the same, the exhaust gas recirculation rate being obtained by dividing an amount of exhaust gas flowing from the exhaust gas recirculation passage into the intake passage by an amount of air flowing into the intake passage.

* * * * *